United States Patent [19]

Mudge et al.

[11] Patent Number: 4,661,389
[45] Date of Patent: Apr. 28, 1987

[54] MULTIPLE-LAYER REINFORCED LAMINATE

[75] Inventors: Richard C. Mudge, Minneapolis; Timothy K. Fair, Blaine, both of Minn.

[73] Assignee: Leucadia, Inc., New York, N.Y.

[21] Appl. No.: 753,627

[22] Filed: Jul. 10, 1985

Related U.S. Application Data

[63] Continuation of Ser. No. 593,824, Mar. 27, 1984, abandoned.

[51] Int. Cl.⁴ ................................................ B32B 5/12
[52] U.S. Cl. ...................... 428/110; 428/284; 428/285; 428/286; 428/296; 428/373; 428/913
[58] Field of Search .................. 156/244.11, 244.12, 156/244.24, 244.27; 428/107, 110, 138, 247, 255, 373, 296, 284, 285, 286, 913

[56] References Cited

U.S. PATENT DOCUMENTS

| Re. 27,544 | 1/1973 | Bramley et al. | 428/373 |
|---|---|---|---|
| 2,919,467 | 1/1960 | Mercer | 18/12 |
| 3,072,511 | 1/1963 | Harwood | 154/46 |
| 3,088,844 | 5/1963 | Hungerford | 117/47 |
| 3,234,313 | 2/1966 | Miller et al. | 264/230 |
| 3,236,675 | 2/1966 | Hermitte et al. | 117/47 |
| 3,271,495 | 9/1966 | Gronholz et al. | 264/210 |
| 3,285,766 | 11/1966 | Barkis et al. | 117/7 |
| 3,308,215 | 3/1967 | Last | 264/95 |
| 3,433,573 | 3/1969 | Holladay et al. | 8/55 |
| 3,510,549 | 5/1970 | Tsuboshima et al. | 264/95 |
| 3,519,531 | 7/1970 | James et al. | 161/254 |
| 3,600,267 | 8/1971 | McFedries, Jr. et al. | 161/165 |
| 3,634,552 | 10/1972 | Foglia et al. | 156/167 |
| 3,666,609 | 5/1972 | Kalwaites et al. | 161/169 |
| 3,700,521 | 10/1972 | Gaffney | 156/167 |
| 3,708,383 | 1/1973 | Thomas et al. | 161/57 |
| 3,716,132 | 2/1973 | Lewyckyj | 161/84 |
| 3,723,218 | 3/1973 | Gaffney | 156/167 |
| 3,767,353 | 10/1973 | Gaffney | 264/DIG. 81 |
| 3,775,231 | 11/1973 | Thomas | 161/57 |
| 3,817,807 | 6/1974 | Braun et al. | 156/181 |
| 3,849,520 | 11/1974 | Bullard et al. | 260/897 |
| 3,865,903 | 2/1975 | Nahmias et al. | 260/889 |
| 3,891,008 | 6/1975 | Entremont | 138/146 |
| 3,891,737 | 6/1975 | Marsh et al. | 264/95 |
| 3,937,762 | 2/1976 | Nahmias | 260/889 |
| 3,962,388 | 6/1976 | Driscoll | 264/51 |
| 4,085,244 | 4/1978 | Stillman | 428/192 |
| 4,123,491 | 10/1978 | Larsen | 264/167 |
| 4,152,479 | 5/1979 | Larsen | 428/224 |
| 4,190,692 | 2/1980 | Larsen | 428/107 |
| 4,285,998 | 8/1981 | Thibodeau | 428/35 |
| 4,296,161 | 10/1981 | Kaiser | 428/171 |
| 4,297,410 | 10/1981 | Tsuchiya | 428/283 |
| 4,297,411 | 10/1981 | Weiner | 428/347 |
| 4,340,558 | 7/1982 | Hendrickson | 264/171 |
| 4,410,587 | 10/1983 | Fair et al. | 428/110 |
| 4,410,591 | 10/1983 | Okamoto et al. | 428/373 |
| 4,414,272 | 11/1983 | Watanabe et al. | 428/373 |
| 4,421,819 | 12/1983 | Baker | 428/373 |

FOREIGN PATENT DOCUMENTS 928954 6/1963 United Kingdom .
966892 8/1964 United Kingdom .
1144281 3/1969 United Kingdom .

OTHER PUBLICATIONS

Copy of abandoned U.S. application Serial No. 769,332, filed Oct. 21, 1968 entitled Extruded Adhesive Net and Structures Using Same.

Primary Examiner—James J. Bell
Attorney, Agent, or Firm—Vidas & Arrett

[57] ABSTRACT

Laminated sheet product reinforced with composite heat sealable plastic strands and process for preparation thereof.

10 Claims, 9 Drawing Figures

MULTIPLE-LAYER REINFORCED LAMINATE

This is a continuation, of application Ser. No. 593,824, filed Mar. 27, 1984 now abandoned.

BACKGROUND OF THE INVENTION

This invention relates to laminated sheet product reinforced with composite plastic strands carrying a layer or coating (complete, partial or segmented) of heat sealable adhesive material, preferably a thermoplastic polymer, and to a process for the preparation thereof. The strands are sandwiched between layers of outer covering material which may be plastic film; foil e.g., aluminum foil; paper e.g., filled or coated paper, Kraft paper, tissue paper (various plys) or various absorbent sheet-like materials. In its preferred form, the invention provides improved reinforced absorbent toweling.

The plastic strands used to reinforce the product are comprised of a core polymer of relatively high strength e.g., polypropylene or polyester. The strands carry a layer or coating of heat sealable adhesive material, such as a polymer, which at least partially covers the strands. Preferably, the strands are prepared by co-extruding or tri-extruding the composite material in a special extrusion die. The strands may be arranged in any form of reinforcing web as has been used heretofore in this art. However, it is most preferred if they are extruded in the form of plastic netting.

The invention will be described in specific detail hereinbelow with reference to its most preferred embodiment of continuous absorbent toweling comprised of multi-ply tissue reinforced with continuous tri-extruded plastic netting. The netting is sandwiched between the paper and, by means of heat bonding and pressure sealing, the toweling is prepared in a laminated sheet form.

The continuous extrusion of plastic net started in about 1956 with the process described in the Mercer U.S. Pat. No. 2,919,467. Since that time, many patents have issued in the United States as well as in other countries describing improvements and refinements in the continous extrusion process.

The initial extrusion process developed along two basic lines: the first, in which plastic sheet is extruded and holes are formed therein to provide a net-like structure, and the second, in which individual plastic strands are extruded and oriented in an interconnecting network to provide the net-like structure. This invention specifically relates to a variation in the latter of the two.

Methods for practicing the latter technique are well known. For instance, U.S. Pat. Nos. 3,700,521; 3,767,353; 3,723,218; 4,123,491; 4,152,479 and 4,190,692 show apparatus and methods for making net by continuous extrusion of strands.

The disclosures of the above-mentioned issued patents are incorporated by reference into the present specification as are all of the patents which may be referred to hereinbelow in further description of this invention.

In all of these patents at least one set of strands is extruded through a plurality of spaced individual orifices. A second set of strands in the net structure may be extruded through a second set of spaced individual orifices or a second set of strands may be preferentially extruded periodically through a continuous annular orifice slit. In all cases the two sets of strands are extruded such that the individual strands intersect at an angle and form integral joints in the extruded plastic net. The resulting extruded flat sheet in one process, or tube of plastic net in another process, is cooled to set the plastic in the strands, as for example in a water bath, and the net is drawn away from the extrusion orifices by nip rolls or other suitable drawing means. It will be obvious that the spacing between strands and strand diameter may be varied as desired.

When a tube of net is extruded, it is usually drawn over a cylindrical mandrel which may stretch the strands and enlarge the openings in the net structure. Such stretching of the strands over the mandrel preferentially orients the plastic but in practice the net is characterized as being "unoriented".

For many applications, it is desirable to further stretch the net strands and more fully orient the plastic and this may be done, where as in the case of a tube of extruded net, the tube is heated and stretched longitudinally to further elongate and orient the strands. Stretching the tube causes it to collapse while the tube is being stretched longitudinally. If the tube has been slit and formed into a flat sheet of extruded net, the flat sheet may be heated and one set of strands may be stretched and oriented in one direction, and in a second separate step, the second set of strands may be stretched to orient the strands in a second direction. Some plastic net may be oriented at room temperature but as a practical matter the net is heated to speed up and facilitate orientation of the net.

SUMMARY OF THE INVENTION

It has been unexpectedly found that individual interconnecting strands extruded to form net-like structures can be co-extruded, even under shear conditions, in the form of composite laminar strands. Laminar flow of a plurality of polymers from a co-extrusion die to form individual strands has been found, contrary to expectation, to result in an extruded composite strand which exhibits a laminar structure. It was fully expected that extrusion of laminar flow through the relatively small strand orifices of the die, coupled with the mechanical shear action to which the flow is subjected when forming interconnecting strands, would result in disturbance of the laminar flow and mixing of the plurality of polymers to provide a strand of mixed polymers without the distinguishing laminar structure.

In one preferred form, the invention provides laminated sheet product incorporating a net-like structure composed of individually extruded strands, each strand of which is formed of a high-strength polymer coated or sandwiched between outer layers of a relatively lower softening temperature, heat sealable type of polymer material as each strand emerges from a three-layered die. Three-layered strands and netting are referred to herein as being "tri-extruded".

Typical high-strength resins for the core are polypropylene, high-density polyethylene, low-density polyethylene, linear low-density polyethylene and polyester and copolymers. Polypropylene is a preferred high temperature resin because of its relatively low cost and low orientation temperature. The encapsulation of polypropylene or the like within heat sealable resins such as ethylene-methyl acrylate copolymer (EMA), ethylene-vinyl acetate copolymer (EVA) or ionomer resins e.g., Surlyn ®, a modified polyethylene marketed by E. I. DuPont de Nemours Co., and the like provides a composite reinforcement material which may be used, when sandwiched between layers of outer covering material, to heat bond and pressure seal the composite together, thus forming a sheet laminate.

The co-extrusion and specifically tri-extrusion of a net-like product in the film form is known and described in U.S. Pat. No. 4,410,587. However, this patent does not suggest that laminar flow of polymers through a co-extrusion or tri-extrusion slot die can be accomplished to provide composite laminar extruded strands.

BRIEF DESCRIPTION OF THE DRAWINGS

Further details of the invention may be readily understood by reference to the following description and the drawings in which.

DETAILED DESCRIPTION OF THE INVENTION

Figure 1:
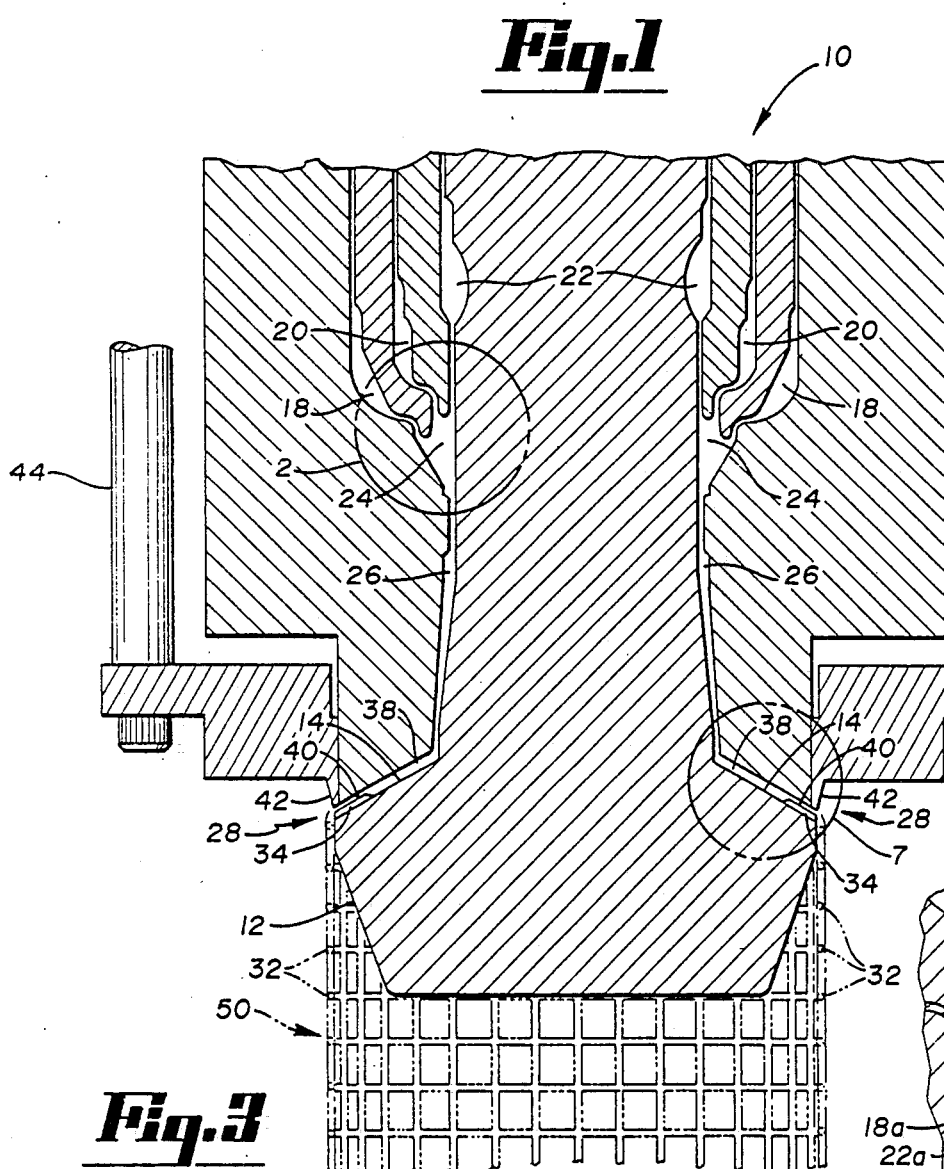
FIG. 1 is an elevational cross section on the vertical axis of a portion of an extrusion die.

Generally, in accordance with a preferred embodiment of the invention, plastic machine-direction strands are continuously extruded through a plurality of spaced orifice openings which are annularly disposed about an extrusion die head. An adjacent continuous orifice extending annularly about the die head is alternately covered and uncovered so as to provide, each time it is uncovered, an interconnecting transverse direction strand. The mechanism which is moved to alternately cover and uncover the continuous annular orifice is referred to herein as a striker.

The extrusion produced by the above structure comprises a tube of plastic net which in general has rectangular-shaped openings extending along the length of the tube.

As is known in the prior art, slitting the tube at the end remote from the extruder die allows the net-like product to be flattened into a sheet-like form which may then be subjected to orientation procedures and other treatment as is well known in the art.

Turning now specifically to the drawing figures, the process for preparing a preferred embodiment of the invention will be described in detail as involving the tri-extrusion of a network of composite strands each of which is comprised of a laminated, extruded structure exhibiting a distinct inner layer sandwiched between oppositely disposed outer layers of polymer material.

Figure 2:
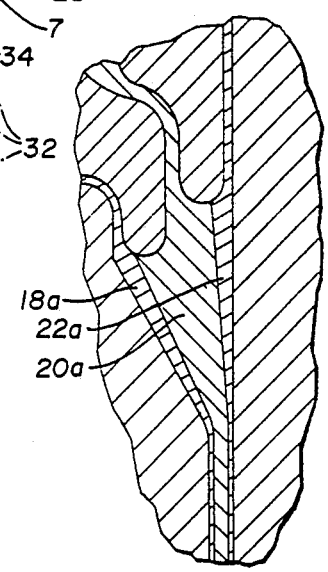
FIG. 2 is an enlarged fragmentary detail of part of the extrusion die of FIG. 1 taken in the area marked 2 in FIG. 1.

Referring to FIG. 1, an annular extrusion die 10 is shown in part as including an annular extrusion head 12. Die 10 is of the type generally known to the art and will include standard features such as support bolts and adjustment structures (not shown) as are known and familiar. However, the die differs in one important respect. In die 10, three separate reservoirs 18, 20 and 22 of polymer materials 18a, 20a and 22a (shown in FIG. 2), respectively, are maintained under pressure and provided to the die by an extrusion system (not shown) and individual polymeric material flow is supplied to die 10 as indicated to the annularly disposed reservoirs 18, 20 and 22. All of these reservoirs communicate and direct flow into a common annular reservoir 24. Reservoir 24 receives the three separate flows of polymer materials 18a, 20a and 22a, respectively, which come together in annular reservoir 24 in a three-layer laminar flow pattern which exits from reservoir 24 into a common annular feed channel 26. This is best seen in FIG. 2 which shows three laminar layers of flowing polymer 18a, 20a and 22a. The three-layers flow past the die lips, generally indicated at 28, to form composite three-layer strands in an interconnecting network which provides a tubular net-like structure 50 shown in FIGS. 1 and 3.

Figure 6:
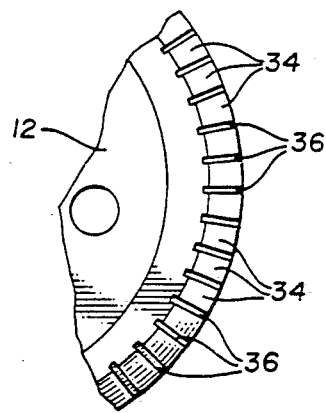
FIG. 6 is a fragmentary to plan view of the die head plate of the extrusion die head only.

For the purpose of extruding machine-direction strands 30 and transverse direction strands 32, lips 28 of the die are preferably formed as shown and include on the upper die head plate surface 14 a series of raised and spaced lands 34, best seen in FIG. 6, which form therebetween a series of annularly positioned lower die orifices 36 through which the machine-direction strands 30 are continuously extruded from the die.

As can be seen best in FIG. 1, lands 34 on die head plate 14 are spaced from portion 38 of die 10 so as to provide an upper passage 40 above the lands in the form of a continuous annular orifice which extends around the die. Associated with upper die passage 40 is a reciprocable striker 42 which may be alternately lowered and raised by a suitable means indicated at 44 to cover and uncover upper passage 40 (shown uncovered in FIG. 1). Striker 42 contacts the upper surface of lands 34 on its downward stroke.

Figure 3:
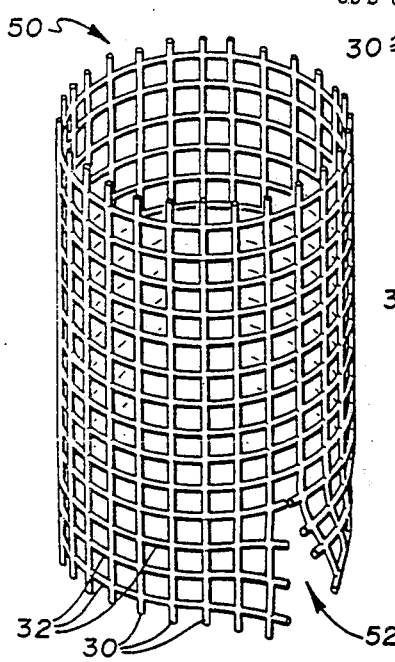
FIG. 3 is a pictorial view of the preferred product, a tubular extruded net, with a small part of the netting cut on the longitudinal axis to illustrate how the tubular netting may be cut and made to open up into a flat sheet of netting.
Figure 7:
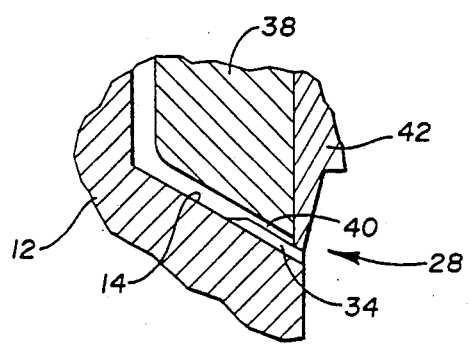
FIG. 7 is a fragmentary section in enlarged detail of part of FIG. 1 taken in the area marked 7 of FIG. 1 with the die striker in a lowered position.
Figure 8:
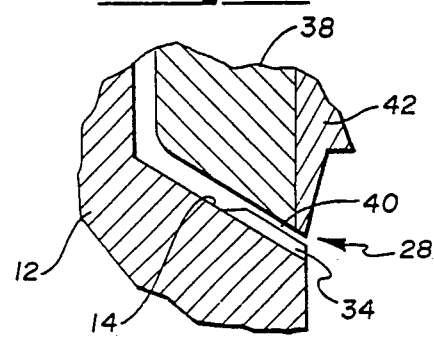
FIG. 8 is a fragmentary view similar to that of FIG. 7 but with the striker in a raised position.

When striker 42 is in the lower position (best seen in FIG. 7), passage 40 is closed and only the continous extrusion of machine-direction strands 30 occurs through lower orifices 36 which remain open at all times to continuously extrude the spaced plurality of machine-direction strands 30 in annularly distributed pattern as shown in FIGS. 1 and 3. When striker 42 is raised to its upper position (best seen in FIG. 8), passage 40 is uncovered to allow the extrusion of an annular transverse-directed strand 32.

Reciprocating movement of striker 42, which is relatively rapid, provides for the spaced extrusion of transverse-direction strands 32 to interconnect the continuously extending machine-direction strands 30 thereby forming the tubular net-like structure 50 shown in FIGS. 1 and 3.

Figure 4:
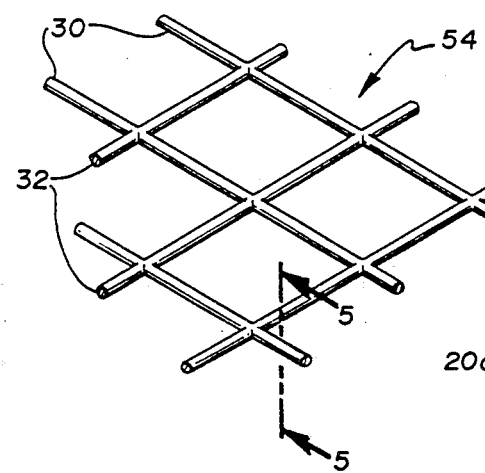
FIG. 4 is a fragmentary view of a small portion of the flattened netting described in FIG. 3 in enlarged scale.

The resulting tube of net generally indicated at 50 is drawn downwardly away from the extrusion die head 12, preferably over a cylindrical mandrel (not shown) and through a water bath (not shown) preferably by a pair of nip rolls (not shown), as is already known in the art. After the plastic strands have set, the tube of net is preferably slit longitudinally in the known manner as generally indicated at 52 in FIG. 3 and opened into a flat sheet 54, a fragment of which is shown in FIG. 4.

The sheet may be accumulated on a wind-up roll in the known manner (not shown).

Figure 5:
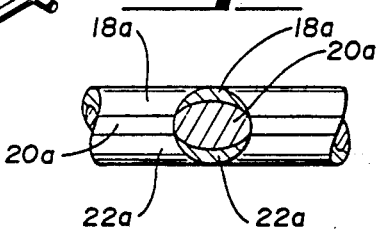
FIG. 5 is a sectional view of a strand of the netting taken along line 5—5 of FIG. 4 and greatly enlarged.

In accordance with the present invention, the strands extruded with the die of FIG. 1 are composite and exhibit a laminated multi-layer structure as is shown in FIG. 5 when polymer 20a differs from polymers 18a and 22a. The multi-layer structure shown is the preferred three-layer tri-extruded structure comprising a core polymer 20a sandwiched between a first outer layer 18a and a second outer layer 22a both of adhesive material, which are generally oppositely disposed relative to each other.

The unexpected advantage provided lies in the fact that the composite laminar structure provided by the three-layer flow within the die body is maintained and exhibited in the extruded strands even though extrusion is accomplished through the relatively small strand-forming orifices formed in extrusion head 12 coupled with the shearing action provided by striker 12.

In accordance with a preferred embodiment of the invention, the outer polymer layers 18a and 22a may be relatively stable, heat-sealable type adhesive polymers and other heat-sealable adhesive materials which may be chosen from the group of adhesive resins and the like. These materials when in polymeric form are of the type which have a softening temperature lower than that of the core polymer and include for example ethylene-methyl acrylate copolymer (EMA), ethylene-vinyl acetate copolymer (EVA) and thermoplastic polyvinylchlorides, polyamides. In other forms they may include hot melt adhesives, ionomer resins such as Surlyn ®, marketed by E. I. DuPont de Nemours Co., thermoplastic rubbers such as Kraton ®, marketed by Shell Chemical Co., Houston, Tex., and the like. The term "polymer" is used herein in the general sense to include copolymers. A most preferred resin polymer is ethylene-methyl acrylate copolymer (EMA).

The core polymer material 20a may be chosen from those polymers which are generally described herein as being of the high-strength polymers and may be chosen from the group consisting of for example, polypropylene, polyethylene, polybutylene, polyesters, nylons and the like.

It will be appreciated that the invention is not limited to the aforementioned groups of materials and that there exists a considerable number of polymers, copolymers, and the like which will fall into the core category and the heat-sealable adhesive category, relatively speaking.

Figure 9:
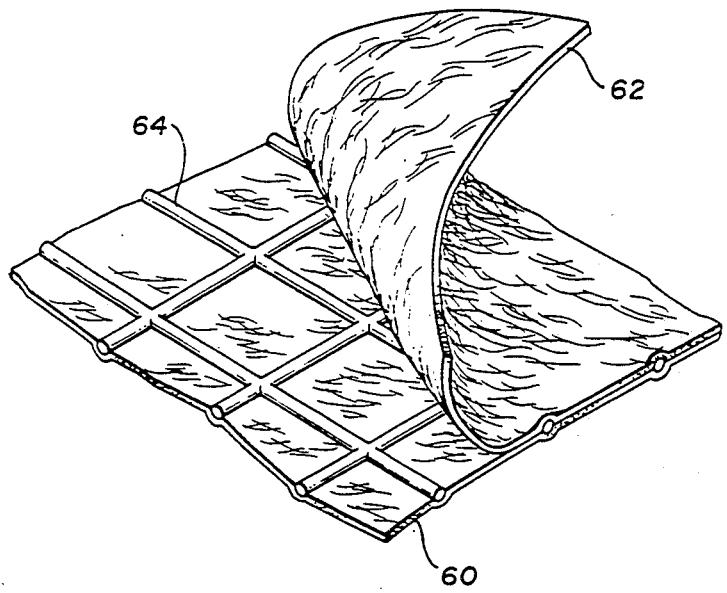
FIG. 9 is a pictorial view of the sheet product of the invention.

In the tri-extruded form, a most preferred combination comprises a core layer 20a of polypropylene while the two outer layers 18a and 22a comprise ethylene-methyl acrylate copolymer (EMA) or ethylene-vinyl acetate copolymer (EVA), the former being most preferred. This particular combination of materials, when biaxially oriented, provides an excellent tri-extruded reinforcement material useful for tissue and other sheet product reinforcement when sandwiched between two layers of outer fabric such as paper, tissue, foil or the like as indicated in FIG. 9. The outer fabric layers are indicated at 60 and 62. The reinforcing net structure is indicated at 64. The ethylene-methyl acrylate copolymer (EMA) or other material used at 18a and 22a has the advantage of providing a heat fusible adhesive function which heat bonds the reinforcing net-like structure to the outer fabric layers 60 and 62 when the composite is subjected to heat and pressure. The materials of 18a and 22a need not be identical.

As already noted, any flexible outer covering material, such as, for example, aluminum foil, polyester film, nylon film, paper cellophane, oriented polypropylene, acetate film and the like may be used as the outer covering of the laminate. Absorbent paper is preferred for the purpose of providing reinforced toweling. A preferred tissue stock for this purpose is available from Scott Paper Company having a weight of 9-19 pounds/3,000 square feet in plys of two, three and four. Another absorbent material for use with this invention is described in U.S. Pat. No. 4,296,161.

The most preferred heat sealable material is EMA, several types of which are available from Gulf Oil Chemicals e.g., 2205, 2255 and 2207T, among others. Several types of EVA are available from E. I. DuPont de Nemours & Co. as 3180, 3175 and 3190, among others.

Heat bonding and pressure sealing as practiced heretofore in the art is satisfactory in preparing the laminates of this invention. Generally, this may be accomplished by various means e.g., contacting opposite sides of the sandwich assembly or composite with heated platens or rolls.

EXAMPLE 1

Tri-extruded netting of polypropylene with DuPont EVA #3180 and Scott tissue stock as described above in two-ply. Hot roll temperature 200°-250° F. for heat bonding and pressure sealing.

EXAMPLE 2

Tri-extruded netting of polypropylene with DuPont EVA #3175 and Scott tissue stock as described above in two-ply. Hot roll temperature 200°-250° F.

EXAMPLE 3

Tri-extruded netting of polypropylene with DuPont EVA #3190 and Scott tissue stock as described above in two-ply. Hot roll temperature 200°-250° F.

EXAMPLE 4

Tri-extruded netting of polypropylene and Gulf Oil Chemicals EMA 2205. Hot roll temperature 220°-250° F.

Peel Tests

The peel test data provided herein was obtained by separating the layers of the test laminate and measuring the force required to accomplish separation. The force is measured in grams and reported below as normalized for strand count and weight of adhesive coating for comparison purposes.

| Example 1 | Example 2 | Example 3 | Example 4 |
| --- | --- | --- | --- |
| 172* | 81* | 98* | 139* |

*grams/strand/pounds of resin/1,000 sq. ft.

These peel tests compare very favorably to absorbent toweling prepared in the standard fashion using similar paper, latex adhesive and ordinary single layer plastic netting reinforcement which, when peel tested, provides a 10 grams/strand/pound of resin/1,000 sq. ft. as a typical result.

It will be understood that the claims are intended to cover all changes and modifications of the preferred embodiments of the invention herein chosen for the purpose of illustration.

What is claimed is:

1. A multiple layer, reinforced laminate produced by heat bonding and pressure sealing a composite structure comprising in combination: a reinforcing network of interconnecting thermoplastic strands sandwiched between layers of outer covering material, the strands being comprised of an inner reinforcing core of polymeric material and an outer extrudable material of a heat sealable type, the inner and outer materials being co-extruded by continuous extrusion in laminar relationship to form the strand network, whereby the inner cores are integrally joined to each other at points of interconnection by virtue of the extrusion formation thereof.

2. The laminate of claim 1 in which the strand network comprises extruded oriented netting.

3. The laminate of claim 1 in which the strand structure is tri-extruded in laminar form and is comprised of at least two different polymers, the inner core polymer having a softening temperature which is higher than that of the outer polymer, the outer polymer comprising generally oppositely disposed layer segments on the core.

4. The laminate of claim 3 in which the core polymer comprises polypropylene and the outer polymer is ethylene methyl acrylate copolymer (EMA).

5. The laminate of claim 3 in which the outer covering material is of the absorbent type.

6. The laminate of claim 3 in which the outer covering material comprises tissue stock.

7. The laminate of claim 6 in which the core polymer comprises polypropylene and the outer polymer is ethylene methyl acrylate copolymer (EMA).

8. The laminate of claim 1 in which the core polyme comprises polypropylene.

9. The laminate of claim 1 in which the outer extrudable material is ethylene methyl acrylate copolymer (EMA).

10. The laminate of claim 1 in which the core polymer comprises polypropylene and the outer extrudable material is ethylene methyl acrylate copolymer (EMA).

* * * * *

UNITED STATES PATENT AND TRADEMARK OFFICE
CERTIFICATE OF CORRECTION

PATENT NO. : 4,661,389

DATED : April 28, 1987

INVENTOR(S) : Mudge, Richard C. et al

It is certified that error appears in the above-identified patent and that said Letters Patent is hereby corrected as shown below:

Column 4, line 53, the word appearing as "transverse-directed" should read --transverse-direction--.

Column 8, line 13, the word appearing as "polyme" should read --polymer--.

Signed and Sealed this

First Day of September, 1987

*Attest:*

DONALD J. QUIGG

*Attesting Officer*      *Commissioner of Patents and Trademarks*